April 13, 1954 P. HÄRTER 2,675,189
FILM WINDING AND LOCKING MECHANISM FOR MINIATURE CAMERAS
Filed Sept. 12, 1951 3 Sheets-Sheet 1

Paul Härter
INVENTOR.
BY
ATTORNEYS

April 13, 1954   P. HÄRTER   2,675,189
FILM WINDING AND LOCKING MECHANISM FOR MINIATURE CAMERAS
Filed Sept. 12, 1951   3 Sheets-Sheet 3

Paul Härter
INVENTOR.
BY
ATTORNEYS

Patented Apr. 13, 1954

2,675,189

UNITED STATES PATENT OFFICE 2,675,189

FILM WINDING AND LOCKING MECHANISM FOR MINIATURE CAMERAS

Paul Härter, Stuttgart-Wangen, Germany, assignor to Eastman Kodak Company, Rochester, N. Y., a corporation of New Jersey Application September 12, 1951, Serial No. 246,241

20 Claims. (Cl. 242—71)

The present invention relates to cameras of the roll-film type, and more particularly to a film-winding and -locking arrangement for such cameras.

The present invention provides an arrangement by which the film winding mechanism is locked automatically at the completion of the film winding operation. The winding of the film also serves to measure the latter so that the film moves a definite lineal amount upon each actuation of the winding mechanism. In the event that the operator decides not to complete the winding mechanism, means is provided by which a portion of the winding mechanism may be returned to its initial position.

The invention has as its principal object the provision of a new and improved film-winding and -locking mechanism.

A further object of the invention is the provision of a mechanism which normally prevents return of the winding lever until the winding has been completed.

Yet a further object of the invention is the provision of an auxiliary release device which may be used to render the locking means inoperative after only a partial winding so as to allow the return of the lever and its associated parts to their initial or inoperative position.

A still further object of the invention is the provision of an arrangement in which the forward or winding movement of the lever serves automatically to connect the lever to the take-up spool and the film-measuring roll so as to operate these parts. However, during the return movement of the lever, the latter is disconnected completely and automatically from the film-measuring roll and the film spool.

To these and other ends, invention resides in certain improvements and combinations of parts, all as will be hereinafter more fully described, the novel features being pointed out in the claims at the end of the specification.

Similar reference numerals throughout the various views indicate the same parts.

Figs. 1-6 of the drawings show one side wall 11 of a camera body on which the mechanisms of the present invention are mounted. These mechanisms may be enclosed by suitably shaped cover plate 12 which is detachably secured to the wall 11 in any suitable and well known manner. For the purpose of clarity, in all but Fig. 2, the cover plate has been omitted. As the present invention relates only to the film-winding and -locking mechanism, only so much of the camera body as is necessary to show the relation of the present invention is illustrated and described. The remaining parts of the camera may be of any suitable or standard design and form no part of the present invention.

As is well known, a film supply spool may be placed in one end of a camera body. The film is unwound from the supply spool, passed over an exposure aperture, and finally wound upon a take-up spool 13, usually positioned in the opposite end of the camera body from the supply spool. The camera illustrated is of the type used in connection with a film cassette into which the film is rewound after the entire roll of film has been exposed. Therefore, the take-up spool in the present embodiment is permanently and rotatably positioined in the camera body. As such spool arrangements are well known, details are not shown or described. Suffice it to say that, after the exposure has been made, the spool 13 is rotated, by mechanisms to be later described, to wind up the exposed film area. After each area has been completely wound, the spool is locked against further rotation. In addition, the wall 11 supports one end of a shaft 14 on which is mounted a film-measuring roll 15 formed with teeth 16 adapted to engage in the marginal perforations of a film strip, as is well known by those in the art. The roll 15 is usually made of such a size that one rotation, or a definite number of rotations, thereof moves the film strip a definite distance, such as the length of one film area. Here, again, as such measuring rolls are old and well known, further details are not shown or described.

Figure 1:
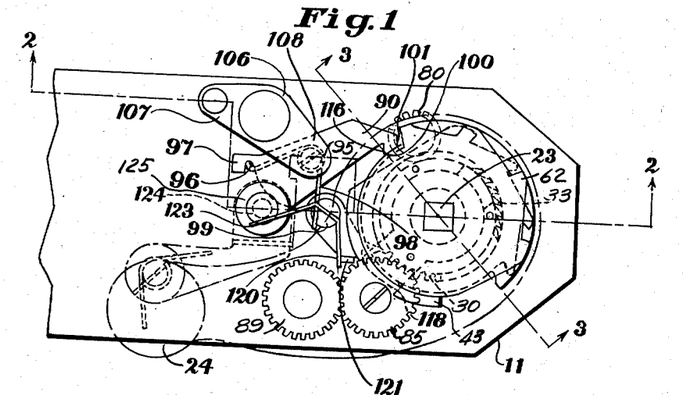
Fig. 1 is a plan view of a roll film camera, with the cover plate removed, showing a film-winding and -locking mechanism constructed in accordance with the present invention, the parts being in their locked position after the film has been wound, but before the shutter is actuated.
Figure 2:
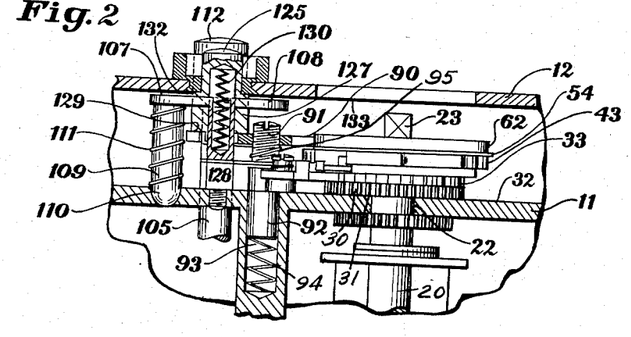
Fig. 2 is a vertical sectional view taken substantially on line 2—2 of Fig. 1 showing the relation of parts.
Figure 3:
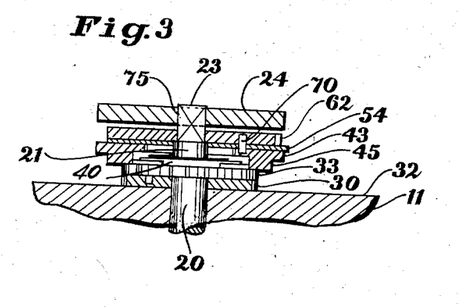
Fig. 3 is a vertical sectional view taken through the winding spindle and substantially on line 3—3 of Fig. 1 showing the relation of the parts.
Figure 5:
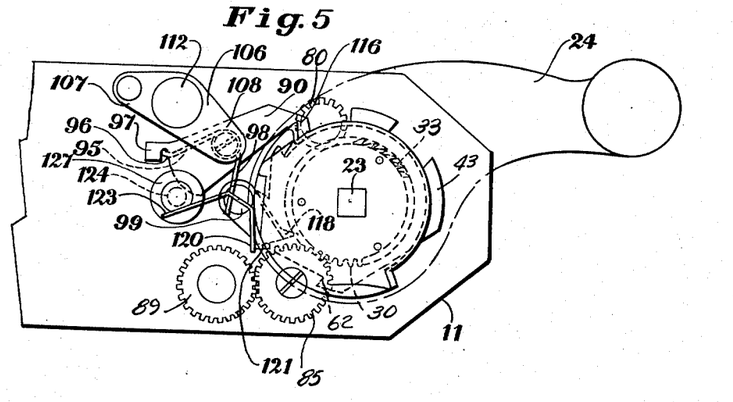
Fig. 5 is a view similar to Figs. 1 and 4, but showing the position of the parts at the end of the film-winding operation.
Figure 6:
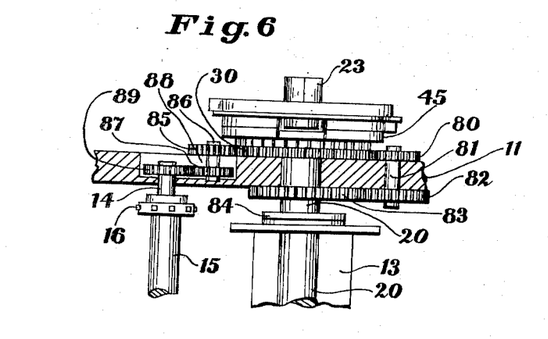
Fig. 6 is a side elevation view of the winding spindle and associated parts showing the connection to the film-measuring roll and the take-up spool.
Figure 10:
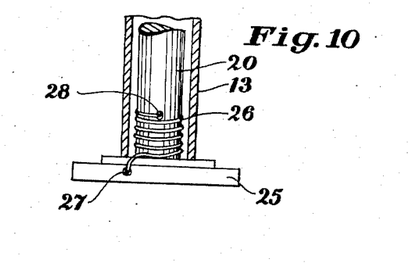
Fig. 10 is a vertical sectional view through the take-up spool and spindle assembly showing one method of spring-loading the spindle.

A winding axle or spindle 20 is positioned within, and preferably concentric with, the spool 13, and is formed with a cylindrical portion 21 which projects through a registering opening 22 in the wall 11, as best shown in Figs. 2, 3, and 6. The spindle 20 terminates in a square upper end 23. The spindle 20 is adapted to be rotated manually in one direction from the position shown in Fig. 1 to that shown in Fig. 5 to rotate both the roll 15 and the spool 13 to measure and wind up the film area. The spindle 20 may be manually returned to its initial or inoperative position shown in Fig. 1. However, it is preferred to spring-load the spindle so that such return will be automatic and complete merely by releasing the lever 24 after the winding has been completed. To secure this result, the spindle may be extended through the spool 13 so that the lower end of the spool is journaled in the opposite side wall 25 of the camera body, as best shown in Fig. 10. A coil spring 26 is would around the lower end of the spindle 20, and has one end 27 anchored in the wall 25 while the other end 28 is bent and extends into a registered hold in the spindle, all as clearly shown in Fig. 10. Thus, the spindle 20 is spring-loaded so that when it reaches the point shown in Fig. 5, the winding is completed, and the lever 24 may be released and will be returned automatically to the position shown in Fig. 1 by means of the tensioned spring 26, all of which is deemed apparent.

Figures 7, 8, 9:
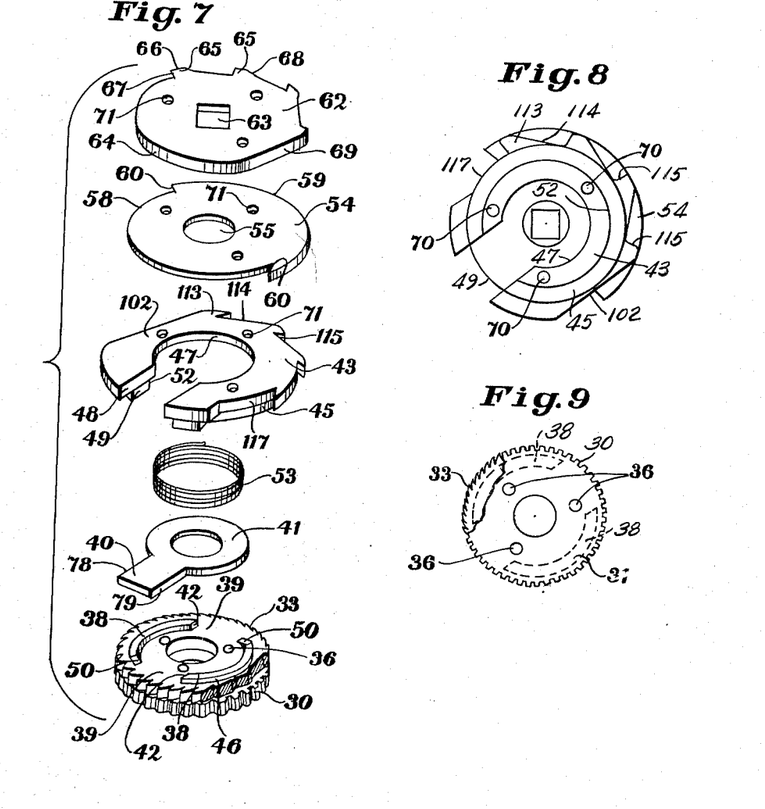
Fig. 7 is an exploded view of the parts positioned on and carried by the winding spindle to connect the winding lever to the take-up spool and measuring roll.
Fig. 8 is a bottom view of the upper gear and ratchet assembly.
Fig. 9 is a bottom view of the lower gear and ratchet assembly.

In assembling the structure of the present invention, a cog wheel or gear 30 is slid over the squared end 23 of spindle 20 and is moved along the latter until the lower surface 31 of the gear rests on the upper surface 32 of the wall 11, see Fig. 2. A locking wheel or ratchet 33 is also slid over the spindle 20 and is moved downwardly and along the latter until the lower face of the ratchet rests on the upper face of the gear 30. In this position, the gear 30 and ratchet 33 are mounted loosely on the cylindrical portion 21 of spindle 20. While the gear 30 and ratchet 33 are separately formed, to facilitate handling, they are preferably secured together so as to form a unitary structure. To this end, the gear 30 and ratchet 33 are connected together by means of pins, rivets, or other suitable fastening means 36, which extend through registering holes in the gear and ratchet so as to connect these members to form a unitary structure, as is deemed apparent from an inspection of Figs. 7 and 9. The upper face of ratchet 33 has positioned thereon or formed integral therewith a pair of upwardly extending arcuate shaped flanges 38, as best shown in Fig. 7. Adjacent ends of the flanges 38 are spaced to provide diametrically arranged slots 39 in which may be positioned a flap or tongue 40 which projects radially from a flat annular blade 41, which is of a diameter such as to fit loosely inside of the flanges 38 and to lie on the upper face of the ratchet 33. One end edge of each flange 38 is formed with a vertical abrupt shoulder 42, while the opposite end edge 50 is tapered or inclined to form a cam surface, as best shown in Fig. 7 and for a purpose to be later more fully described. The outer edges of flanges 38 are spaced inwardly a slight distance from the periphery of the ratchet 33, for a purpose to be presently described.

A ratchet plate 43 has secured to the under side or face thereof, a downwardly extending annular flange or skirt 45, the internal diameter of which is slightly greater than the outer diameter of the flanges 38 so that the outer surfaces 46 of the latter act as guides to position the flanges 45 and, hence, the ratchet 43 in vertical alignment with the gear 30 and ratchet 33, as best shown in Fig. 3. The flange 45 may be formed integral with ratchet 43; but, for purposes of manufacturing, it is separately formed therefrom and then secured thereto so as to form an integral part therewith. The ratchet 43 is formed with an enlarged central opening 47, the purpose of which will be later described. The ratchet 43 and the flange 45 are formed with vertically aligned, radially extending slots 48 and 49, respectively, which are equal in width to the slots 39 and to the tongue 40, so that the latter may be received in the slots 39, 48 and 49 when the slots are in vertical alignment, as shown in Fig. 3. The ratchet 43, and its attached flange 45, is positioned on the spindle 20 with a lower face of the flange resting on the upper face of ratchet 33, and the inner surface 52 of flange 45 engaging the outer surfaces 46 of flanges 38 to position the ratchets 43 and 33 in vertical alignment. A coil spring 53 is then positioned over the spindle with the bottom of the spring resting on the blade 41 and the spring projecting upwardly through the central opening 47 of ratchet 43.

A flat control plate 54, of the shape best shown in Fig. 7, has a central aperture 55 which is slightly larger than the portion 21 of spindle 20, but smaller than the opening 47 of ratchet 43. The plate 54 is then positioned on the spindle 20 and slid downwardly therealong until the lower face of plate 54 engages, and is supported by, the upper face of ratchet 43, as illustrated in Fig. 3. In this position, the lower face of the control plate engages the upper end of coil spring 53 to hold the latter in yieldable engagement with the blade 41 to retain the latter in position against the upper face of ratchet 43 and to hold tongue 40 in the slots 39 between the flanges 38. The plate 54 has a peripheral portion 58 of one diameter and another portion 59 of a larger diameter, as clearly illustrated in Fig. 7. The portion 58 constitutes a release section, as will later be explained. Diametrically arranged, substantially radial shoulders 60 are positioned between and connect the two portions 58 and 59, as is deemed apparent from an inspection of Fig. 7. On top of the control plate 54 is positioned an upper ratchet or locking plate 62, formed with a square central opening 63 which is adapted to receive the square end 23 of spindle 20 to connect the ratchet 62 directly to the spindle. The ratchet plate 62 is of the shape best shown in Fig. 7, and has a peripheral portion 64 which is substantially the same diameter and is arranged in alignment with the smaller portion 58 of the plate 54. In addition, the ratchet 62 is formed with teeth 65, the tips 66 of which are in substantial vertical alignment with the edge of the larger peripheral portion 59 of plate 54. The left edge of each tooth is formed to provide a sharp radial shoulder 67 while the other or right side 68 of each tooth is tapered, the purpose of which construction will be later described. The right end portion 64 of ratchet 62 is connected to the right tooth 65 by means of an inclined section 69 which is spaced approximately 180° from the left tooth 65, see Fig. 7. When the ratchet plates 43 and 62 and the separating control plate 54 are in position on the spindle 20, they are in the relation shown in Figs. 3 and 7. Means may be provided to retain these parts in proper assembled relation. However, it is preferred to rigidly connect these parts by means of rivets 70 or other fastening means which extend through registering holes 71 in the ratchet plates 43 and 62 and the control plate 54 to connect these parts to provide what may be termed the "upper assembly," the parts of which are positively retained in proper relative positions, the advantages of which are deemed apparent. Accordingly, this "upper assembly" may be positioned as a unit on the spindle 20 and when the slots 48 and 49 are in vertical alignment with tongue 40, the assembly is in proper position relative to the lower gear 30 and ratchet 33 to insure proper assembly and arrangement of the parts.

Figure 4:
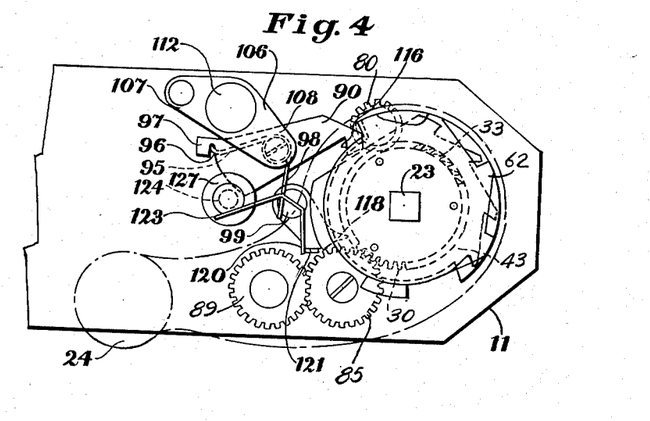
Fig. 4 is a view similar to Fig. 1 but showing the position of the parts after the actuation of the shutter.

The winding lever 24 is of the shape shown in Figs. 1, 4, and 5, and is formed with a central square opening 75 adapted to receive the square end 23 of the spindle 20, as best shown in Fig. 3. Thus, when the lever is attached to the spindle 20, and the lever is rotated in a counterclockwise direction, the spindle will be similarly rotated. By reason of the square opening 63 in the upper ratchet plate, the entire "upper assembly" will be rotated as a unit with the spindle and the lever. Such counterclockwise rotation will cause the left edges of slots 48 and 49 to engage the left edge 78 of tongue 40 to move the blade 41 as a unit with the upper assembly in a counterclockwise direction. Such movement of the blade will cause the right edge 79 of the tongue 40 to engage the shoulder 42 of the right flange 38, Fig. 7, to cause the ratchet 33 and gear 30 to rotate counterclockwise as a unit will the spindle and upper assembly.

This rotation of the gear 30 is utilized to rotate the spool 13 and the film measuring roll 15. To this end, a gear 80, meshing with gear 30 is mounted on the upper end of a stub shaft 81, journaled on a wall 11, as shown in Fig. 6. The shaft 81 extends through the wall 11, and has mounted on the lower end thereof a gear 82 which meshes with a gear 83, connected to the spool 13 through a slip clutch 84 of any standard or suitable construction. In addition, a second gear 85 also meshes with gear 30 and is mounted on the upper end of a stub shaft 86 journaled in a wall 11. The lower end of shaft 86 carries a gear 87, positioned in a recess 88, formed in the wall 11. A gear 89, secured to the measuring roll shaft 14 meshes with gear 87. Thus, when the spindle and the upper assembly are rotated in a counterclockwise direction, the take-up spool 13, and the film measuring roll 15, are both rotated to measure the film area and to wind the latter on a take-up spool. In addition to winding the film, the counterclockwise rotation of the spindle serves to set or tension the shutter. However, as such setting and tensioning means forms no part of the present invention, it is not illustrated or described.

A blocking member in the form of a pawl 90 cooperates with the ratchet plates 43 and 62 and the control plate 54 to control the winding of the film area. This pawl 90 is mounted for vertical movement on a threaded portion 91 of a stem 92 which extends into, and is guided in, a depending well or container 93 on wall 11, as best shown in Fig. 2. This well 93 has positioned therein a coil spring 94 which engages and tends to move stem 92 and pawl 90 upwardly to position pawl 90 in the horizontal plane of the ratchet 62, as shown in Fig. 2. A hairpin spring 95 is wrapped around the threaded portion 91 and has one end 96 secured to an arm 97 of pawl 90, while the other end 98 of the spring 95 engages a screw 99, carried by wall 11. This spring 95 thus tends to rock pawl 90 in a clockwise direction as viewed in Figs. 1, 4 and 5, to bring a surface 100 thereof into engagement with the portion 64 of the ratchet plate 62 which is to the left of the shoulder 67 of the left tooth 65, as shown in Fig. 1. In this position, a surface 101 of the pawl 90 lies behind the shoulder 67 of the left tooth 65, and will prevent counterclockwise movement of the lever 24; and, hence, will prevent winding or movement of the film strip. It is apparent from an inspection of Fig. 2 that if the pawl 90 is moved downwardly against the action of spring 94, the surface 101, will be moved out of blocking or holding relation with the shoulder 67, and the entire mechanism will be free to be rotated in a counterclockwise direction to wind the film. However, as a pawl 90 is spring pressed upwardly by means of spring 94, means must be provided to retain the surface 101 out of a blocking relation with the shoulder 66 once the pawl 90 has been moved downwardly.

Referring now to Fig. 7, it is seen that portion 64 of ratchet 62 and portion 58 of plate 54 are of equal diameter and are in vertical alignment so that when the pawl 90 is moved downwardly, the surface 100 will slide over both the ratchet plate 62 and the control plate 54 until the surface 100 comes into horizontal registration with a flat surface or edge 102 of the ratchet plate 43. Surface 102 of ratchet 43 is spaced inwardly or is of a smaller diameter than the portions 64 and 58 of ratchet plate 62 and control plate 54, respectively, so that when the surface 100 of pawl 90 comes into registry with surface 102, the pawl is moved radially inwardly and under the plate 54 by reason of spring 95, so that the plate 54 will be rendered operative to hold the pawl against a return upward movement once the pawl has been pushed downwardly. Upon release of pressure on pawl 90, the latter cannot move upwardly into registry with ratchet 62 because it is held down by the overhanging edge of the portion 58 of the plate 54. When the pawl is thus moved downwardly, the ratchet 62 is freed and the lever 24 may be rotated in a counterclockwise direction to wind up the film area and to rotate the film spool and the measuring roll.

The pawl 90 may be moved vertically downwardly directly, but it is preferred to control such downward movement from the shutter-tripping mechanism so that the film winding mechanism may not be rotated until after the shutter has been released to make an exposure. The shutter release in the present embodiment comprises a vertical stem 105 which is slidable through a registering opening in the wall 11. At its upper end, the stem 105 has mounted thereon a normally extending plate 106 which is formed with two laterally projecting arms 107 and 108, respectively. The end of arm 108 overlies stem 92, and is normally spaced therefrom, as shown in Fig. 2. The other arm 107 has depending therefrom a peg 109 which is guided in a registering opening 110 in the wall 11, as best shown in Fig. 2. A coil spring 111 surrounds peg 109 and is positioned between wall 11 and plate 106 and serves normally to retain the latter out of contact with stem 92. The plate 106 of the release mechanism has a button 112 which extends through a registering opening in the cover plate 12 so that the shutter may be actuated from a point outside the camera body. When the shutter is to be actuated, the button 112 is pressed downwardly. This movement carries the stem 105 and plate 106 downwardly to trip the shutter. As the downward movement of plate 106 is continued, the arm 108 of the plate finally engages stem 92 and shifts the latter and pawl 90 downwardly against the action of spring 94 and out of the plane of the upper ratchet plate 62. Such movement causes surface 100 of the pawl to slide over the upper ratchet plate 62 and the control plate 54, and when the pawl is positioned below the latter, the pawl is rocked clockwise to move the surface 100 into engagement with the inwardly positioned surface 102 of the ratchet 43 to lock the pawl in its down or disengaged position. In this lower position, the pawl is held against upward movement by reason of the overhanging portion 58 of the control plate 54, and the parts are now unlocked and the lever 24 may be operated to wind the film.

During such winding, the pawl 90 rides over the teeth 113 of the ratchet 43. It will be noted from Fig. 7 that the teeth 113 are shaped oppositely to the teeth 65 of ratchet 62 so as to provide an inclined surface 114 to the left of each tooth 113 and a sharp radial shoulder at the right of each tooth 113. The result is that as the parts are rotated counterclockwise, the surface 100 of pawl 90 will ride over the inclined surface 114 while the surface 116 of the pawl would drop successively behind each shoulder 115 to prevent return movement of the lever and its associated parts until the winding of the film has been completed. During this counterclockwise rotation of the spindle and the upper assembly, the plate 40 and the tongue 41 thereof are rotated so as to rotate the lower gear 30 to actuate the measuring roll 14 and the spool 13 as above described.

The length of the blocking portion 59 of plate 54 and the number of teeth 113 on ratchet 43 are so designed that the surface 100 of pawl 90 is held in engagement with ratchet 43 by portion 59 until the exposed film area has been completely wound. When this point is reached the pawl 90 registers with a smooth or mutilated portion 117, of ratchet 43, which is of a smaller diameter than teeth 113. The portion 117 is positioned beneath and is substantially equal in diameter to the smaller portion 58 of the plate 54 just to the left of the right shoulder 60, Fig. 7. At this point, the portion 59 of plate 54 no longer acts as a blocking member for the pawl 90 and the latter is then free to move upwardly under the action of spring 94, and into the plane of the upper ratchet plate 62. The parts are then free, and the lever 24 may be rotated in a clockwise direction to return the parts to the position shown in Fig. 4. During this return movement, the surface 100 of pawl 90 merely rides over the inclined sides 68 of teeth 65 until the parts reach the position shown in Fig. 1 at which time the surface 101 of the pawl 90 then drops behind the shoulder 67 of the left tooth 65 of the ratchet 62 to lock the entire mechanism against further counterclockwise or winding movement. During this return movement of the winding lever, the tongue 40 of the blade 41 first engages the inclined cam surface 50 of the left flange 38, and then the tongue slides along the upper surface of the left flange until the lever has returned to the position shown in Fig. 1 at which time the tongue now registers with, and drops into, the other slot 39 under the action of the spring 53.

During the movement of the tongue 40 over the left flange 38, the gear 30 and ratchet 33 remain stationary. Thus, the spool 13 and the roll 15 are connected in operative relation with and are driven positively by the upper assembly when the latter is rotated in a counterclockwise direction and the film is measured and wound. However, during the return movement of the upper assembly, the spool 13 and roll 15 are completely and positively disconnected from the upper assembly and idle, the advantages of which are deemed apparent. To insure such idling, a pawl 118 is positioned on screw 99 and engages ratchet 33 to lock the latter and gear 30 against reverse movement when the winding lever and the upper assembly are returned to their starting positions. The pawl 118 is held in yieldable engagement with ratchet 33 by means of a hairpin spring which is wrapped around screw 99 and has one end 120 engaging a lug 121 formed on pawl 118. The other end 123 of the spring engages a stationary screw 124, the lower end of which is threaded in wall 11 in horizontal alignment with spindle 20 as best shown in Figs. 1, 4, and 5.

As mentioned above, the engagement of pawl 90 with the teeth 113 of ratchet plate 43 normally prevents any reverse rotation of the parts, after once started, until the winding operation has been completed. It sometimes happens, however, that after the operator has started to wind the film, he may decide not to continue the winding. As the pawl 90 engages ratchet teeth 113, the lever 24 would be in position somewhere between that shown in Fig. 1 and that shown in Fig. 5. Obviously, it is not desirable for the lever 24 to remain in this position. For this reason, the present invention provides an additional or auxiliary means for releasing the parts to permit them to return to the position shown in Fig. 1 before the winding operation has been completed. During the winding, the gear 30 and ratchet 33 have been partially rotated and the film has been partially wound. The result is that while the lever in the upper assembly may be returned to the position in Fig. 1, the gear 30 and ratchet 33 are positioned intermediate to the initial final positions. The exact point depends on how far the winding operation has been carried.

This auxiliary releasing means is in the form of a trip button 125 which projects above the top wall of the cover plate 12, as best shown in Fig. 2. The button 125 extends downwardly through a register opening in wall of plate 12, and, below the latter, is formed to provide and enlarged tubular portion 127 which slidably engages in telescoping relation a smaller tubular portion 128 formed on the upper end of the stationary screw 124, as best shown in Fig. 2. The lower end 129 of the portion 127 overlies the left arm 97 of pawl 90, as shown in Figs. 1, 4 and 5. The trip button 125 is spring pressed upwardly by coil spring 130 positioned in the tubular portion 128 and engages an under surface of the button 125, as best shown in Fig. 2. An annular shoulder 132 formed at the upper end of portion 127 engages the under surface 133 of top wall of plate 12 to limit the upward movement of the button 125 by spring 120.

As mentioned above, during the winding operation, the pawl 90 will be in the plane of the ratchet 43 and positioned to engage teeth 113 to prevent return movement of the winding lever 24 of the upper assembly. However, if such return movement is desired before the completion of the winding operation, the operator merely presses down on the button 125 to move the latter downwardly relative to the tubular portion 123. Such downward movement serves to bring the lower end of portion 127 into engagement with the left arm 97 of pawl 90 to shift the latter downwardly and out of the plane of the ratchet 43 and into the plane of the circular flange 45. The surface 100 of the pawl is now moved into engagement with the outer cylindrical surface of flange 45 by reason of the action of spring 95. As the surface 100 of the pawl 90 now rides on the circular flange 45, no restriction is imposed to the return movement of the parts, which are then rotated in a clockwise direction back to the position shown in Fig. 1. During this return movement, the gear 30 and ratchet 33 remain stationary and in a partially moved position. Also, as the winding has not been completed, the shutter is not set and cannot be operated. Thus, by merely depressing the button 125, the return locking means for the winding mechanism is rendered inoperative and certain parts may be returned to their initial position without completing the winding operation.

Now, when the lever 24 is again moved in a counterclockwise direction, the upper assembly moves as a unit therewith. However, as gear 30 and ratchet 33 have been partially rotated, the tongue 40 will be positioned on the top of the left flange 38. However, when the upper assembly has been moved to the point of the prior partial winding, the tongue 40 will register with and will drop into the slot 39, and will then pick up the gear 30 and ratchet 33 so these members will move as a unit with the upper assembly to complete the winding. At the end of the winding, the lever and upper assembly are returned to their initial position, while the gear 30 and ratchet 33 remain stationary, as above described. In normal operation, the lever and upper assembly are not released for return movement until the film winding has been completed. However, if the operator so desires, the winding may be stopped at any point, and then by pressing down on button 125, the winding lever of the upper assembly may be returned to their initial or inoperative position, shown in Fig. 1. Thus, the pawl 90 may be moved out of engagement with ratchet plate 42 and into cooperative relation with ratchet plate 43 by moving stem 105 downwardly to trip the shutter. In addition, further downward movement of the pawl 90 may be secured by pressing downwardly on the auxiliary button 125 to move the pawl 90 out of engagement with ratchet plate 43 and into the plane of flange 45. Thus, two separate and independent means are provided to actuate the panel 90.

The operation of the device may be briefly described as follows:

With the parts in the position shown in Fig. 1, and the shutter set, the stem 105 is moved downwardly to trip the shutter to make an exposure. This downward movement of stem 105 carries plate 106 downwardly and into engagement with pawl 90 to shift the latter axially downward and out of the plane of, and out of holding relation with, the teeth 65 of the upper ratchet plate 62. As the pawl 90 moves downwardly, it slides over the peripheral portion of plate 54 and then moves inwardly radially under portion 58 and into engagement with surface 102 of the lower ratchet 43. The pawl 90 is now held against a return upward movement, and the parts are now in position for winding. The lever 24 is then moved in counterclockwise direction to move the entire upper assembly, the pawl 90 engaging the teeth 113 of the ratchet 43 to prevent return movement of the lever. This rotation of the upper assembly serves to move tongue 40 into engagement with the shoulder 42 of the right flange 38 to rotate gear 30 and ratchet 33, as a unit with the spindle to wind and measure the film. When the movement is completed, pawl 90 registers with surface 117 of ratchet 43 and the smaller portion 58 of plate 54 and the latter no longer blocks pawl 90. The result is that the latter moves upwardly and into the plane of the upper ratchet plate 62 and the parts are released. The spindle 20, lever 24 and the upper assembly are then returned to their initial position by reason of spring 26. During the film winding the shutter is tensioned and the parts are ready for another cycle. However, during the return movement of the lever, the gear 30 and ratchet 33 remain stationary. When the parts are returned to their original position the surface 101 of pawl 90 engages behind the left tooth of upper ratchet plate 62 to prevent a second winding operation. During such winding surface 116 engages shoulders 115 on teeth 113 to prevent return movement of the parts until the winding is completed.

If it is desired to return the lever and the upper assembly, and its directly connected parts, to their initial position before winding has been completed, the auxiliary button 125 is pressed downwardly to move pawl 90 downwardly and out of the plane of ratchet plate 43 and into engagement with flange 45 to release the parts so that the latter may be returned to a position corresponding with that assumed by the parts after the shutter has been set. It will be noted, however, that if the parts are returned after a partial winding, surface 100 of pawl 90 engages surface 102 of the lower ratchet plate 43 so that the pawl is under portion 58 of plate 45 and cannot be returned upwardly to locking relation with ratchet plate 62. The result is that after partial winding, although the parts are returned to the starting position, the winding may again be completed without operating the shutter.

The present invention thus provides a film winding and locking mechanism which will wind only a definite length of film during each actuation. During normal winding, the parts are locked against return movement until the winding is completed. However, if desired, the parts may be released and returned after partial winding. Then the operator may complete the winding without operating the shutter. However, after the winding has been completed and the parts returned to their initial position, and the winding mechanism is locked against a second actuate until the shutter has been tripped.

While one embodiment of the invention has been disclosed, it is to be understood that the inventive idea may be carried out in a number of ways. This application is, therefore, not to

What I claim and desire to secure by Letters Patent of the United States is:

1. In a roll film camera, the combination with a rotatable film spool on which exposed image areas may be wound successively, of means for rotating said spool to wind said areas, a ratchet plate, a control plate positioned below said ratchet plate, means to arrange said plates in axial alignment and to connect said plates to said moving means for unitary movement therewith, a pivoted pawl engaging said ratchet plate to lock said rotating means against film winding movement, means to move said pawl out of holding relation with said ratchet plate, means on said control plate engaging said pawl to hold the latter positively out of engagement with said ratchet plate until the winding of said area has been completed, and a releasing section on said control plate for releasing said pawl when the winding has been completed.

2. In a roll film camera, the combination with a rotatable film spool on which exposed film areas are adapted to be wound successively, of means including an oscillatable lever connectable to said spool to rotate the latter to wind up said areas, a ratchet plate, a control plate positioned below and in axial alignment with said ratchet plate, means to connect both of said plates to said winding means for movement therewith, a spring pressed pawl engaging said ratchet plate to lock the latter and said winding means against movement in a winding direction, means to move said pawl out of holding relation with said ratchet plate to free said winding means to permit movement thereof in one direction to wind said film, means to connect said lever to said spool when said lever is moved in said one direction, a holding section on said control plate engaging and holding said pawl out of engagement with said ratchet plate during winding, and a releasing section on said control plate for permitting said pawl to move into non-locking engagement with said ratchet plate at the end of the winding, after the winding, the lever being moved in the opposite direction to return the lever and said plates to an initial position whereupon the pawl moves automatically into locking relation with said ratchet plate.

3. In a roll film camera, the combination with a rotatable film spool on which exposed film areas are adapted to be wound successively, of means including an oscillatable lever connectable to said spool to rotate the latter to wind up said areas, a ratchet plate, a control plate positioned below and in axial alignment with said ratchet plate, means to connect both of said plates to said winding means for movement therewith, a spring pressed pawl engaging said ratchet plate to lock the latter and said winding means against movement in a winding direction, means to move said pawl out of holding relation with said ratchet plate to free said winding means to permit movement thereof in one direction to wind said film, means to connect said lever to said spool when said lever is moved in said one direction, a holding section on said control plate engaging and holding said pawl out of engagement with said ratchet plate during winding, a releasing section on said control plate for permitting said pawl to move into non-locking engagement with said ratchet plate at the end of the winding, after the winding the lever being moved in the opposite direction to return the lever and said plates to an initial position whereupon the pawl moves automatically into locking relation with said ratchet plate, and means automatically disconnecting said lever and said plate from said spool when said lever is moved in said opposite direction.

4. In a roll film camera, the combination with a rotatable film spool on which exposed film areas are adapted to be wound successively, of means including an oscillatable lever connectable to said spool to rotate the latter to wind up said areas, a ratchet plate, a control plate positioned below and in axial alignment with said ratchet plate, a second ratchet plate positioned below said control plate and in axial alignment with said plates, means to connect all of said plates to said winding means for movement therewith, a spring pressed pawl engaging said first ratchet plate to lock said plates against movement in a winding direction, means to move said pawl out of holding relation with said first ratchet plate to free said winding means to permit movement in one direction to wind film, means to connect said lever to said spool when said lever is moved in said one direction, a holding section on said control plate engaging and holding said pawl out of engagement with said ratchet plate during winding, a releasing section on said control plate for permitting said pawl to move into non-locking engagement with said ratchet plate at the end of the winding, after the winding the lever being moved in the opposite direction to return the lever and said plates to an initial position whereupon the pawl moves automatically into locking relation with said ratchet plate, and means to disconnect said spool from said lever when the latter is moved in said opposite direction.

5. In a roll film camera, the combination with a rotatable film spool on which exposed image areas may be wound successively, of a spring loaded spindle in axial alignment with said spool, an assembly mounted on said spindle and comprising a pair of axially aligned spaced ratchet plates and a control plate positioned between said ratchet plates, means for mounting said assembly on said spindle for unitary movement therewith, a lever connected to said spindle for rotating the latter and said assembly in one direction, a spring pressed pawl engaging one of said ratchet plates to hold said lever and assembly against movement in said one direction, means to move said pawl out of holding relation with said one ratchet plate to free said lever and assembly for movement in said one direction, means to connect said spool to said lever when the latter is moved in said one direction to wind up an area, means on said control plate for retaining said pawl out of holding relation with said one ratchet plate when the lever is being moved in said one direction, said control plate engaging said pawl to retain the latter out of contact with said one ratchet plate until the lever has completed its movement in said one direction and the area has been wound, said pawl engaging said second ratchet plate to prevent movement of lever and said assembly in the opposite direction until the winding has been completed, a release section on said control plate for releasing said pawl when the winding is completed, means for moving said pawl out of engagement with said second ratchet plate and into engagement with said first ratchet plate, said lever being movable in the opposite direction to return the lever and assembly to an initial position, during said return movement said pawl slides over said first ratchet plate, means to disconnect said spool from said spindle during the return movement of said lever and assembly, and means to retain said spool stationary during the movement of the lever and assembly in said opposite direction.

6. In a roll film camera, the combination with a rotatable film spool on which exposed image areas may be wound successively, of a spring loaded spindle, a winding lever mounted on said spindle, said lever being movable positively in one direction to rotate said spool to wind up said areas, means automatically connecting said spool to said lever when the latter is moved in said one direction, a holding ratchet connected to and movable with said spindle, a spring pressed pawl engaging said ratchet to prevent movement of said lever in said one direction, means to move said pawl axially in one direction and out of holding relation with said ratchet to permit movement of said lever in said one direction to wind up said area, means to move said pawl radially when disconnected from said ratchet, means to retain said pawl out of the path of said ratchet until the winding of said area has been completed, a releasing section on said retaining means positionable in registry with said pawl at the end of said winding, means to move said pawl axially in the opposite direction at the completion of said winding and back into the plane of said ratchet, said spring loaded pawl returning the lever and ratchet automatically in a reverse direction and to an initial position to bring said pawl again into holding relation with said ratchet, and means engaged by said pawl to prevent movement of said lever in said reverse direction during the winding of said area.

7. In a roll film camera, the combination with a rotatable film spool on which exposed image areas may be wound successively, of a spring loaded spindle, a winding lever mounted on said spindle, said lever being movable positively in one direction to rotate said spool to wind up said areas, means automatically connecting said spool to said lever when the latter is moved in said one direction, a holding ratchet connected to and movable with said spindle, a spring pressed pawl engaging said ratchet to prevent movement of said lever in said one direction, a holding plate positioned below said ratchet, said ratchet and said plate having axially aligned portions at the point where the pawl engages the ratchet, a guide member for said pawl positioned below said holding plate, said ratchet plate and member being mounted on said spindle for movement as a unit therewith, said member having a surface positioned radially inwardly of said portions, means to move said pawl axially downwardly and out of the plane of said ratchet and to a point below said holding plate, means to move said pawl radially inwardly against said surface and under said plate so that the latter will retain said pawl out of the plane of and out of holding relation with said ratchet when said lever is moved in said one direction to wind said area, a releasing section formed on said plate and movable into registry with said pawl when the lever has reached the limit of its movement in said one direction to complete the winding of said area, said section serving to release said pawl, and spring means for moving said pawl axially upwardly and into the plane of said ratchet, said spindle and lever being returned automatically to an initial position, and during such return the pawl rides over said ratchet until said initial position is reached whereupon the pawl again engages the ratchet to prevent movement of said lever in said one direction.

8. In a roll film camera, the combination with a rotatable film spool on which exposed image areas may be wound successively, of a spring loaded spindle, a winding lever mounted on said spindle, said lever being movable positively in one direction to rotate said spool to wind up said areas, means automatically connecting said spool to said lever when the latter is moved in said one direction, a holding ratchet connected to and movable with said spindle, a spring pressed pawl engaging said ratchet to prevent movement of said lever in said one direction, a holding plate positioned below said ratchet, said ratchet and said plate having aligned portions at the point where the pawl engages the ratchet, a guide member for said pawl positioned below said holding plate, said ratchet plate and member being mounted on said spindle for movement as a unit therewith, said member having a surface positioned radially inwardly of said portions, means to move said pawl axially downwardly and out of the plane of said ratchet and to a point below said holding plate, means to move said pawl radially inwardly against said surface and under said plate so that the latter will retain said pawl out of the plane of and out of holding relation with said ratchet when said lever is moved in said one direction to wind said area, means on said member engaging said pawl to lock said lever and spindle against movement in the opposite direction until the winding has been completed, a releasing section formed on said plate and movable into registry with said pawl when the lever has reached the limit of its movement in said one direction to complete the winding of said area, said section serving to release said pawl, and spring means for moving said pawl axially upward and into the plane of said ratchet, said spindle and lever being returned automatically to an initial position, and during such return the pawl rides over said ratchet until said initial position is reached whereupon the pawl again engages the ratchet to prevent movement of said lever in said one direction.

9. In a roll film camera, the combination with a rotatable film spool on which exposed image areas may be wound successively, of a spring loaded spindle, a winding lever mounted on said spindle, said lever being movable positively in one direction to rotate said spool to wind up said areas, means automatically connecting said spool to said lever when the latter is moved in said one direction, a holding ratchet connected to and movable with said spindle, a spring pressed pawl engaging said ratchet to prevent movement of said lever in said one direction, means to move said pawl axially in one direction and out of holding relation with said ratchet to permit movement of said lever in said one direction to wind up said area, a holding plate positioned in the path of and engaged by said pawl to hold said pawl out of the plane of and out of engagement with said ratchet during the movement of said lever in said one direction to wind the film, a second ratchet plate positioned below said plate, means for connecting said holding plate and said second ratchet plate on said spindle for unitary movement with said first ratchet, said pawl engaging said second ratchet plate when held by said holding plate to prevent reverse rotation of said lever and spindle during the winding of said film, aligned releasing sections on said holding plate and said second ratchet plate movable into registry with said pawl when said lever has reached its limit of movement in said one direction to free said pawl, and means for moving said pawl axially and in the opposite direction and back into the plane of said first ratchet, said lever and spindle being returned automatically to an initial position and during said return movement the pawl rides over said first ratchet until the latter reaches its initial position whereupon the pawl reengages the first ratchet to prevent movement of said lever and spindle in said one direction.

10. In a roll film camera, the combination with a rotatable film spool on which exposed image areas may be wound, of a spring loaded spindle, an operating lever connected to said spindle and movable in one direction to rotate said spool to wind up the areas, means to connect said spool to said lever when the latter is moved in said one direction, a member secured to said spindle, a movable pawl engaging said member to prevent movement of said lever in said one direction, means to move said pawl out of engagement with said member to free said lever for movement in said one direction to wind said areas on said spool, means to hold said pawl out of engagement with said member during said winding, ratchet means engaged by said pawl to prevent return movement of said lever prior to the completion of said winding, means to release said pawl at the completion of said winding, means to move the released pawl into non-holding relation with said member so that upon the return movement of said lever said pawl will ride over said member, upon return of said lever to an initial position said pawl will move into locking relation with said member to prevent movement of said lever in said one direction, means to disengage said pawl from ratchet means to permit return of said lever to said initial position prior to the completion of said winding, and means to disconnect said spool from said lever during the return of the latter.

11. In a roll film camera, the combination with a rotatable film spool on which exposed image areas may be wound successively, of a spring loaded spindle in axial alignment with said spool, a gear loosely mounted on said spindle, means to connect said gear to said spool so that upon rotation of said gear said spool is rotated, a lever secured to said spindle, means to connect said gear to said lever when the latter is moved in one direction to rotate said gear and spool to wind up an area on said spool, and means for disengaging said connecting means when said lever is moved in the other direction so that said spool will idle.

12. In a roll film camera, the combination with a rotatable film spool on which exposed image areas may be wound successively, of a spring loaded spindle in axial alignment with said spool, a gear loosely mounted on said spindle, means to connect said gear to said spool so that upon rotation of said gear said spool is rotated, a lever secured to said spindle, means to connect said gear to said lever when the latter is moved in one direction to rotate said gear and spool to wind up an area on said spool, and means on said gear for disengaging said gear automatically from said connecting means and said lever when the latter is rotated in the opposite direction so that said spool will idle when the lever is rotated in said opposite direction.

13. In a roll film camera, the combination with a rotatable film spool on which exposed image areas may be wound successively, of a spring loaded spindle in axial alignment with said spool, a gear loosely mounted on said spindle, means to connect said gear to said spool so that upon rotation of said gear said spool is rotated, a lever secured to said spindle, a connecting member positioned between said lever and said gear, means actuated by said lever for driving said connecting member, means on said gear engaged by said connecting member to drive and rotate said gear and spool when said lever is rotated in one direction to wind an area on said spool, and means to disconnect said gear completely from said lever when the latter is rotated in the opposite direction.

14. In a roll film camera, the combination with a rotatable film spool on which exposed image areas may be wound successively, of a spring loaded spindle in axial alignment with said spool, a gear loosely mounted on said spindle, means to connect said gear to said spool so that upon rotation of said gear said spool is rotated, a lever secured to said spindle, a connecting member positioned between said lever and said gear, means actuated by said lever for driving said connecting member, means on said gear engaged by said connecting member to drive and rotate said gear and spool when said lever is rotated in one direction to wind an area on said spool, and a cam on said gear for moving said connecting means out of driving relation with said gear when said lever is rotated in the opposite direction to free said spool.

15. In a roll film camera, the combination with a rotatable film spool on which exposed image areas may be wound successively, of a spring loaded spindle in axial alignment with said spool, a gear loosely mounted on said spindle, means to connect said gear to said spool so that upon rotation of said gear said spool is rotated, a lever secured to said spindle, a locking assembly carried by and rotatable with said spindle, means engaging said assembly to lock said spindle and lever against movement in one direction, holding means for rendering said last-mentioned means inoperative to free said spindle and lever to permit movement of the latter in said one direction, a connecting member positioned between said assembly and said gear, means on said assembly for driving said connecting member upon rotation of said spindle, means on said gear engaged by said connecting member to drive said gear and spool when said lever is moved in said one direction to wind up an area, and means to disengage said connecting member from said gear when said lever is returned to an initial position.

16. In a roll film camera, the combination with a rotatable film spool on which exposed image areas may be wound successively, of a spring loaded spindle in axial alignment with said spool, a gear loosely mounted on said spindle, means to connect said gear to said spool so that upon rotation of said gear said spool is rotated, a lever secured to said spindle, a locking assembly carried by and rotatable with said spindle, means engaging said assembly to lock said spindle and lever against movement in one direction, holding means for rendering said last-mentioned means inoperative to free said spindle and lever to permit movement of the latter in said one direction, a connecting member positioned between said assembly and said gear, means on said assembly for driving said connecting member upon rotation of said spindle, means on said gear engaged by said connecting member to drive said gear and spool when said lever is moved in said one direction to wind up an area, means on said assembly engaged by said holding means for preventing rotation of said lever in the opposite direction until the winding has been completed, means for releasing said lever at the end of said winding operation to permit said lever to rotate in the opposite direction and to an initial position, and a cam on said gear engaging said connecting member to disconnect the latter from said gear when said lever is rotated in said opposite direction.

17. In a roll film camera, the combination with a rotatable film spool on which exposed image areas may be wound successively, of a spring loaded spindle in axial alignment with said spool, an assembly mounted on said spindle and comprising a pair of axially aligned ratchet plates and a control plate between said ratchet plates, a gear loosely mounted on said spindle, means to connect said gear to said spool so that upon rotation of said gear said spool is rotated, a lever secured to said spindle, a connecting member loosely positioned on said gear, a resilient member positioned between said assembly and said gear to retain said member in position on said gear, means on said assembly for connecting said connecting member to said lever for movement on a unit therewith, a spring pressed pawl engaging said first ratchet plate to lock said plates and said lever against movement in a direction to rotate said spool, means to move said pawl out of holding relation with said first ratchet plate to free said lever to permit the latter to be moved in said one direction, means to connect said spool to said lever when the latter is moved in said direction to rotate said spool to wind up said areas, said pawl engaging said second ratchet plate during winding to prevent movement of said lever in the opposite direction until the winding of said area has been completed, a release section on said control plate and said second ratchet plate to disengage said pawl from said second ratchet plate, means for moving said disengaged pawl into the plane of said first ratchet plate so that when said lever is moved in the opposite direction, said pawl will slide over said first ratchet plate until said lever is returned to an initial position whereupon the pawl again moves into locking relation with said first ratchet, a shoulder on said gear positioned to be engaged by said connecting member to rotate said gear to drive said spool to wind up an area when said lever is rotated in said one direction, and a cam surface formed on said gear and engaged by said connecting member when said lever is returned to said initial position to move said connecting member out of driving relation with said shoulder to disconnect said gear completely and positively from said lever so that said spool will idle during the return movement of said lever.

18. In a roll film camera, the combination with a rotatable film spool on which exposed film areas are adopted to be wound successively, of a spring loaded spindle arranged in axial alignment with said spool, a control and locking assembly mounted on said spindle for unitary rotation therewith, said assembly comprising a pair of aligned ratchet plates and a control plate positioned between and separating said ratchet plates, an operating lever secured to said spindle and operatively connected to said plates, a gear loosely mounted on said spindle below and in alignment with said assembly, means to connect said gear to said spool so that the latter will be rotated upon the rotation of said gear to wind up an area on said spool, a blade-like member positioned on said gear, an annular flange formed on said gear and engaging said blade member to position the latter on said gear, a radially extending flap formed on said blade member, said flange being formed with a radial opening in which said flap is positioned, an annular flange on said assembly facing and adapted to receive said first flange to radially position the assembly on said gear, said second flange being formed with a radial opening also to receive said flap so that rotation of said assembly will cause the one edge of said second opening to engage said flap to rotate said blade member as a unit with said assembly and lever, means on said gear for connecting the latter to said flap for unitary rotation with said assembly, a coil spring positioned between said assembly and blade member to retain the latter in engagement with said gear, a spring pressed holding pawl engaging one of said ratchet plates to lock said lever against rotation in one direction to rotate said spool, means to move said pawl out of holding relation with said one ratchet to free said assembly and gear for rotation in said one direction to wind an area, means on said control plate for retaining said pawl out of engagement with said one ratchet plate during the movement of said lever in one direction until the winding of the area has been completed, said pawl engaging said second ratchet during said winding to prevent movement of the lever in the opposite direction until the winding has been completed, release sections on said control plate and said second ratchet movable into registry with said pawl at the completion of the winding, means to move said released pawl back into engagement with said first ratchet to release said lever to permit return of the latter to an initial position, during such return the pawl rides over said first ratchet plate freely until the lever has returned to said initial position at which time the pawl moves into locking relation with said first ratchet plate to prevent movement of said lever in said one direction, and a cam formed on said first flange to cam the flap out of said first opening and to cause said flap to ride freely on said first flange during the return movement of said lever to disconnect the gear and spool from the assembly and lever during the return movement of the latter.

19. In a roll film camera, the combination with a rotatable film spool on which exposed image areas may be wound successively, of a spring loaded spindle in axial alignment with said spool, a gear loosely mounted on said spindle, means to connect said gear to said spool so that upon rotation of said gear said spool is rotated, a measuring roll engaging the film as the latter is being wound up on said spool, means connecting said measuring roll to said gear so that rotation of the latter will also rotate said measuring roll, a lever secured to said spindle, means to connect said gear to said lever when the latter is moved in one direction to rotate said gear and spool to wind up an area on said spool, and means for disengaging said connecting means when said lever is moved in the other direction so that said spool and roll will idle.

20. In a roll film camera, the combination with a rotatable film spool on which exposed film areas are adapted to be wound successively, of a spring loaded spindle arranged in axial alignment with said spool, a control and locking assembly mounted on said spindle for unitary rotation therewith, said assembly comprising a pair of aligned ratchet plates and a control plate positioned between and separating said ratchet plates, an operating lever secured to said spindle, a gear loosely mounted on said spindle below and in alignment with said assembly means to connect said gear to said spool so that the latter will be rotated upon the rotation of said gear to wind up an area on said spool, a measuring roll engaging the film as the latter is being wound up on said spool, means connecting said measuring roll to said gear so that rotation of said gear will also rotate said measuring roll, a blade-like member positioned on said gear, an annular flange formed on said gear and engaging said blade member to position the latter on said gear, a radially extending flap formed on said blade member, said flange being formed with a radial opening in which said flap is positioned, an annular flange on said assembly facing and adapted to receive said first flange to radially position the assembly on said gear, said second flange being formed with a radial opening to receive said flap so that rotation of said assembly will cause the one edge of said second opening to engage said flap to rotate said blade member as a unit with said assembly and lever, means on said gear for connecting the latter to said flap for unitary rotation with said assembly, a coil spring positioned between said assembly and blade member to retain the latter in engagement with said gear, a spring pressed holding pawl engaging one of said ratchet plates to lock said lever against rotation in one direction to rotate said spool, means to move said pawl out of holding relation with said one ratchet to free said assembly and gear for rotation in said one direction to wind an area, means on said control plate for retaining said pawl out of engagement with said one ratchet plate during the movement of said lever in one direction until the winding of the area has been completed, said pawl engaging said second ratchet during said winding to prevent movement of the lever in the opposite direction until the winding has been completed, release sections on said control plate and said second ratchet movable into registry with said pawl at the completion of the winding, means to move said released pawl back into engagement with said first ratchet to release said lever to permit return of the latter to an initial position, during such return the pawl rides over said first ratchet plate freely until the lever has returned to said initial position at which time the pawl moves into locking relation with said first ratchet plate to prevent movement of said lever in said one direction, and a cam formed on said first flange to cam the flap out of said first opening and to cause said flap to ride freely on said first flange during the return movement of said lever to disconnect the gear and spool from the assembly and lever during the return movement of the latter.

References Cited in the file of this patent

UNITED STATES PATENTS

| Number | Name | Date |
|---|---|---|
| 1,308,991 | Parkinson et al. | July 8, 1919 |
| 2,271,221 | Drotning et al. | Jan. 27, 1942 |
| 2,282,075 | Mihalyi | May 5, 1942 |